(12) United States Patent
Lo et al.

(10) Patent No.: US 8,060,141 B2
(45) Date of Patent: Nov. 15, 2011

(54) METHOD FOR PERMITTING CHANGE OF AN ELECTRONIC CARD WITHOUT POWERING OFF AND COMMUNICATIONS DEVICE EMPLOYING THE METHOD

(75) Inventors: Wen-Chieh Lo, Taipei Hsien (TW);
Jiun-Shiung He, Taipei Hsien (TW);
Ming-Zhu Lo, Taipei Hsien (TW);
Feng-Yi Lin, Taipei Hsien (TW);
Sheng-Chih Sun, Taipei Hsien (TW)

(73) Assignee: Wistron NeWeb Corp., Hsichih, Taipei Hsien (TW)

( * ) Notice: Subject to any disclaimer, the term of this patent is extended or adjusted under 35 U.S.C. 154(b) by 746 days.

(21) Appl. No.: 12/127,892

(22) Filed: May 28, 2008

(65) Prior Publication Data
US 2009/0181717 A1 Jul. 16, 2009

(30) Foreign Application Priority Data
Jan. 16, 2008 (TW) ................................ 97101649 A

(51) Int. Cl.
*H04B 1/38* (2006.01)
*H04K 3/00* (2006.01)
(52) U.S. Cl. ..................................... 455/558; 455/435.1
(58) Field of Classification Search ............... 455/550.1, 455/558, 435.1
See application file for complete search history.

(56) References Cited

U.S. PATENT DOCUMENTS
6,461,193 B1 * 10/2002 Matthies ........................ 439/509
2002/0065106 A1 * 5/2002 Bishop et al. ................. 455/558
2005/0090282 A1 * 4/2005 Murayama ................. 455/550.1

FOREIGN PATENT DOCUMENTS
CN 2478288 Y 2/2002
CN 1991802 A 7/2007

* cited by examiner

*Primary Examiner* — Lee Nguyen
(74) *Attorney, Agent, or Firm* — Panitch Schwarze Belisario & Nadel LLP

(57) ABSTRACT

In a method for permitting change of an electronic card without powering off and a communications device employing the method, the communications device includes a control module, a card connector for receiving the electronic card, and a trigger module. The method includes: when the communications device is in an on state, triggering the trigger module to generate a trigger signal to the control module; enabling the control module to determine a card insertion mode if it is detected that a state of electrical connection of the card connector with an electronic card changes from a disconnected state to a connected state after receipt of the trigger signal; and enabling the control module for supplying power to the electronic card inserted into the card connector upon determining the card insertion mode.

14 Claims, 6 Drawing Sheets

METHOD FOR PERMITTING CHANGE OF AN ELECTRONIC CARD WITHOUT POWERING OFF AND COMMUNICATIONS DEVICE EMPLOYING THE METHOD

CROSS-REFERENCE TO RELATED APPLICATION

This application claims priority of Taiwanese Application No. 097101649, filed on Jan. 16, 2008.

BACKGROUND OF THE INVENTION

1. Field of the Invention

The invention relates to a communications device having an electronic card installed therein and a method for permitting change of the electronic card, more particularly to a method for permitting change of an electronic card without powering off, and a communications device employing the method.

2. Description of the Related Art

Mobile communications products are becoming indispensable for modern people, and there are currently available a number of communications systems. Since conventional single-mode handsets are incapable of supporting different communications systems, dual-mode handsets, such as those supporting the PHS system and the GSM system, or even multi-mode handsets, have been developed. With the fast development of communications technology, there are also the 3G system, the 3.5G system, or even the WiFi system. Therefore, multi-mode handsets capable of operating on different communications systems are in demand.

With reference to FIG. 1, for a conventional dual-mode handset 9, a user can put two SIM (subscriber identity module) cards 81, 82 supplied by different communications system service providers in the dual-mode handset 9 so as to be able to use the services provided by two different communications systems.

The dual-mode handset 9 includes a first electrical connector 921 disposed in a circuit module 911 provided in an interior of a housing 910 thereof. The first electrical connector 921 is disposed immediately below a battery module 93 for insertion of the first SIM card 81 (primary card) thereinto. A second electrical connector 922 is disposed at a lateral side of the housing 910 for insertion of the second SIM card 82 (secondary card) thereinto.

However, to install or remove the first SIM card 81, the handset 9 has to be powered off first. Then, the battery module 93 and a back cover 912 are removed to allow installation or removal of the first SIM card 81, which is rather troublesome. For the second SIM card 82, since there is no need to remove the battery module 93, the user may forget to power off the handset 9 before installing or removing the second SIM card 82, which may result in damage to the second SIM card 82. The conventional dual-mode handset 9 is therefore undesirable in terms of user convenience.

SUMMARY OF THE INVENTION

In view of the fact that conventional communications devices need to be powered off before changing an electronic card, and that powering on and off when changing a secondary card on a dual-mode communications device requires activation of both the primary and secondary cards, which is a waste of time and may result in phone calls being missed for the primary card, an object of the present invention is to provide a method for permitting change of an electronic card without powering off.

Accordingly, the method for permitting change of an electronic card without powering off of the present invention is adapted for use in a communications device that includes a power source, a control module, a card connector, and a trigger module. The method includes: when the communications device is in an on state, triggering the trigger module to generate a trigger signal to the control module; enabling the control module to determine a card insertion mode if it is detected that a state of electrical connection of the card connector with an electronic card changes from a disconnected state to a connected state after receipt of the trigger signal; and enabling the control module for supplying power to the electronic card inserted into the card connector upon determining the card insertion mode.

Another object of the present invention is to provide a single-mode communications device that permits change of an electronic card without powering off.

The communications device that permits change of an electronic card without powering off of the present invention includes a power source, a control module, a card connector, and a trigger module. The control module coordinates operations of various components and controls supply of power from the power source to other components. The card connector is adapted for pluggable electrical connection of the electronic card thereto and for delivering power to the electronic card.

The trigger module has a switch and a detection circuit. The detection circuit generates a trigger signal to the control module upon triggering of the switch. The control module determines a card insertion mode and enables supply of power from the power source to the card connector if it is detected that a state of electrical connection of the card connector with the electronic card changes from a disconnected state to a connected state after receipt of the trigger signal.

Preferably, the communications device further includes a memory module, and the control module automatically reads stored data from the electronic card after supplying power to the card connector, and writes the data read thereby into the memory module.

Preferably, after power is supplied to the card connector, the control module reads user identification data from the electronic card, and automatically connects to a communications network to register with the communications network using the user identification data.

Preferably, the control module determines a card removal mode and cuts off power supply to the card connector if it is detected that the card connector is still electrically connected to the electronic card after receipt of the trigger signal, and the control module automatically removes the stored data of the electronic card from the memory module prior to cutting off power supply to the card connector.

A further object of the present invention is to provide a multi-mode communications device that permits change of an electronic card without powering off.

The communications device that permits change of an electronic card without powering off of the present invention includes a power source, a control module, a first card connector, a second card connector, and a trigger module.

The control module coordinates operations of various components and controls supply of power from the power source to other components. The first card connector is adapted for pluggable electrical connection of a first electronic card thereto and for delivering power to the first electronic card. The second card connector is adapted for pluggable electrical connection of a second electronic card thereto and for delivering power to the second electronic card.

The trigger module has a switch and a detection circuit. The detection circuit generates a trigger signal to the control module upon triggering of the switch. The control module determines a card insertion mode and enables supply of power from the power source to the second electronic card connected to the second card connector if it is detected that a state of electrical connection of the second card connector with the second electronic card changes from a disconnected state to a connected state after receipt of the trigger signal.

In the method for permitting change an electronic card without powering off and a communications device employing the method according to this invention, a control module is employed to automatically detect and hence determine whether power is to be supplied to a card connector for an electronic card, thereby permitting quick and easy change of the electronic card without powering off.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
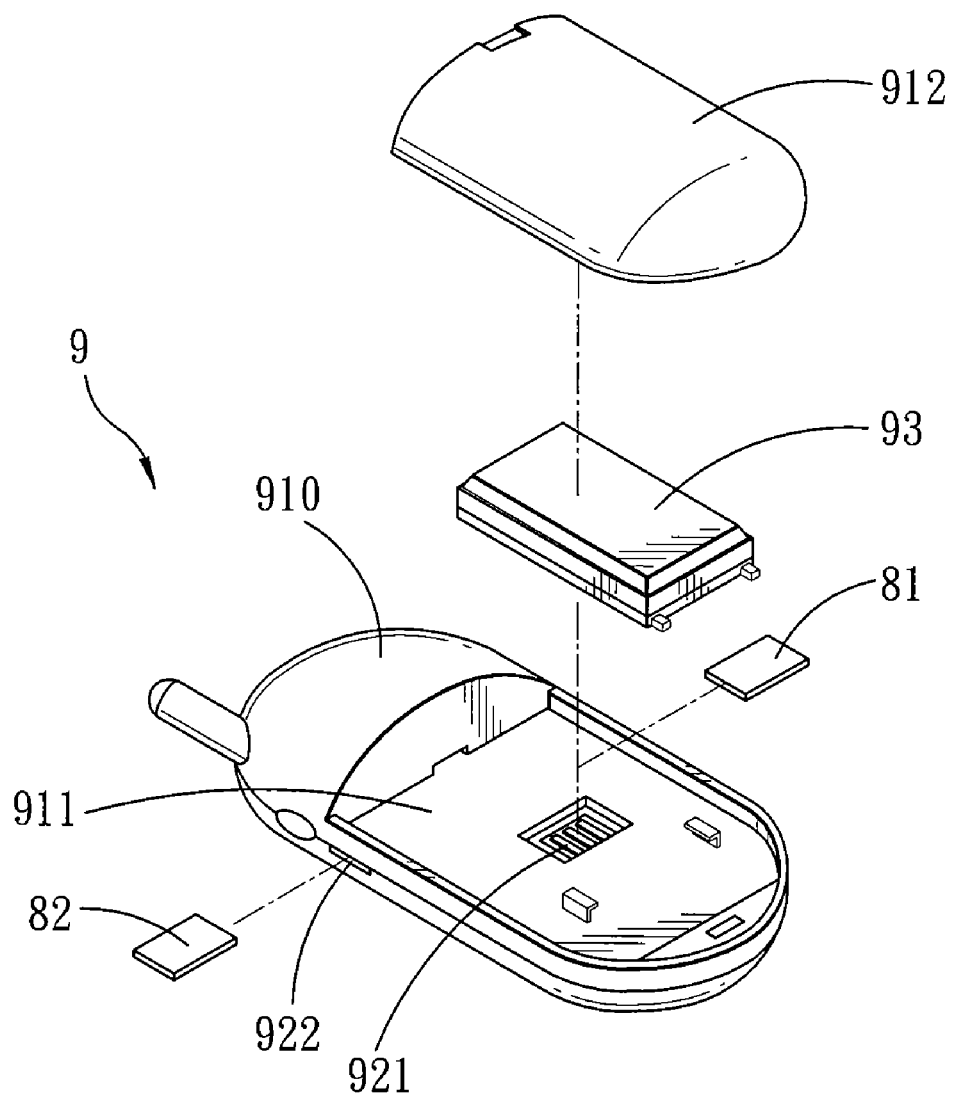
FIG. 1 is an exploded perspective view of a conventional dual-mode handset.
Figure 2:
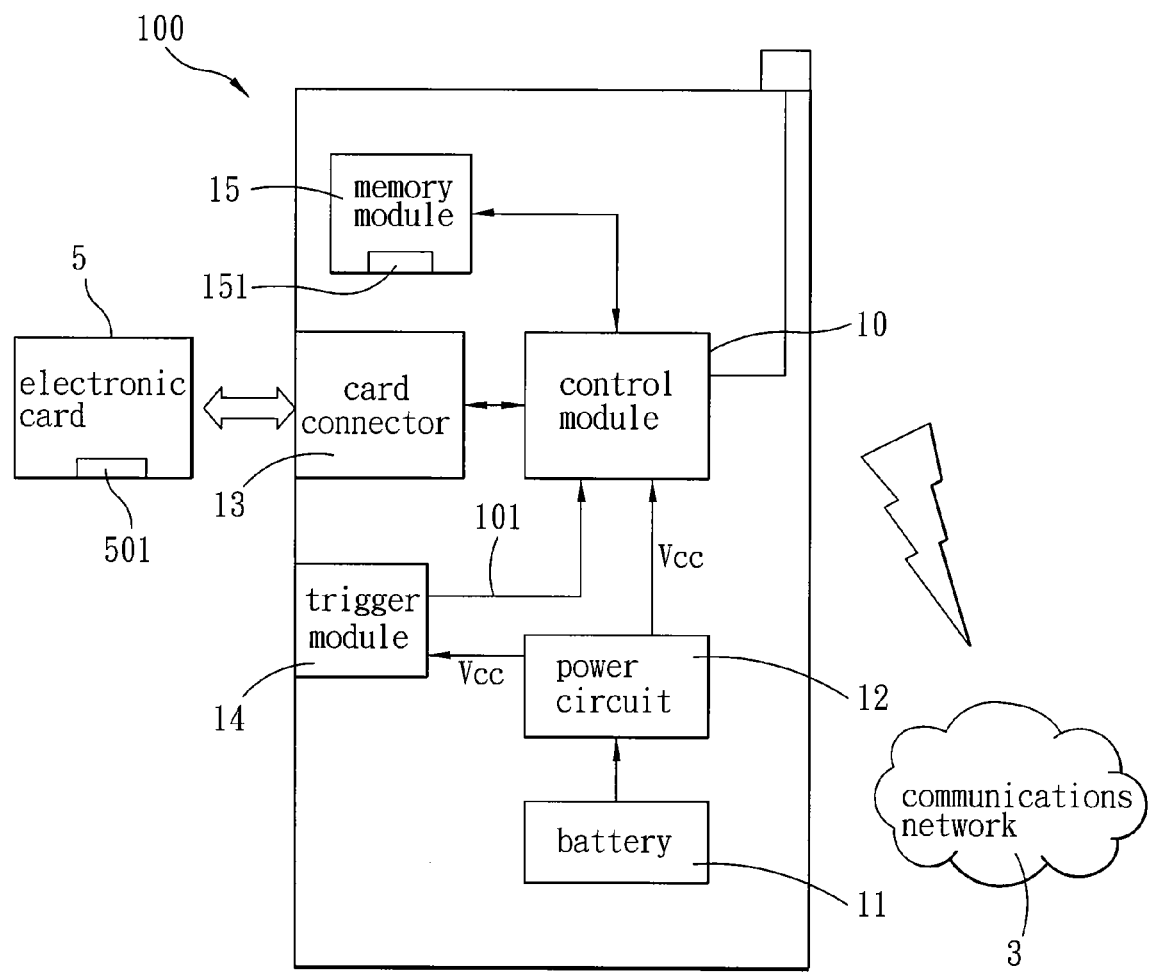
FIG. 2 is a system block diagram to illustrate the first preferred embodiment of a communications device that permits change of an electronic card without powering off according to the present invention.

FIG. 2 illustrates the first preferred embodiment of a communications device 100 that permits change of an electronic card without powering off according to the present invention. As shown, the communications device 100 is a single-mode handset adapted for receiving an electronic card 5. The electronic card 5 is a subscriber identity module (SIM) card containing stored data 501. The stored data 501 includes user identification data, entries of a phone book, text messages, etc.

The communications device 100 includes a control module 10, a battery 11, a power circuit 12, a card connector 13, a trigger module 14, and a memory module 15. Electric power from the battery 11 is converted by the power circuit 12 to a power signal (Vcc) that is supplied to the control module 10 and the trigger module 14. The control module 10 coordinates operations of the various components of the communications device 100, and controls supply of the power signal (Vcc) to other components (such as the card connector 13). The card connector 13 is electrically connected to the electronic card 5. The memory module 15 is used to store data of the communications device 100.

Figure 3:
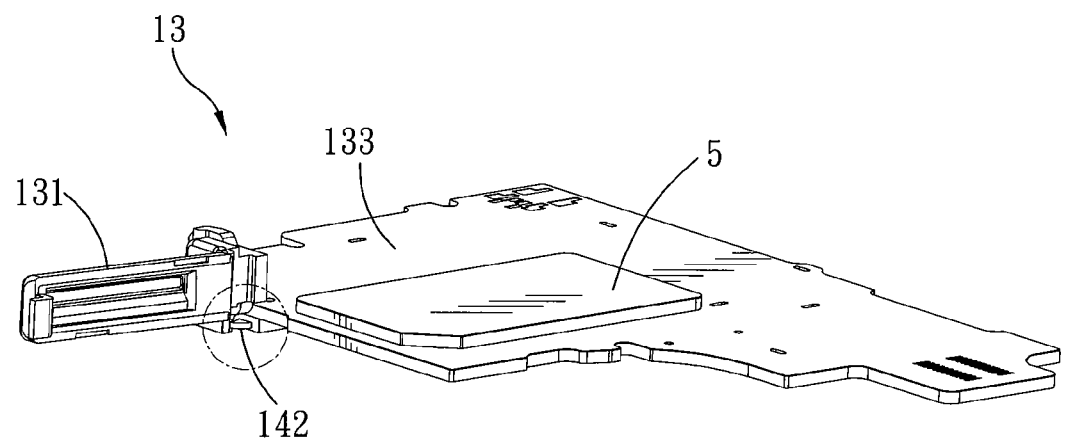
FIG. 3 is a fragmentary perspective view to illustrate a card connector having a cover and a connector body of the first preferred embodiment.

Referring to FIG. 3, the card connector 13 includes a cover 131 and a connector body 133. The card connector 13 is adapted for pluggable electrical connection of the electronic card 5 thereto and for delivering the power signal (Vcc) to the electronic card 5 (a housing of the card connector 13 and an opening for insertion of the electronic card 5 are omitted from the figure to facilitate illustration). The cover 131 is disposed to shield the opening (not shown) in the connector body 133.

Figure 4:
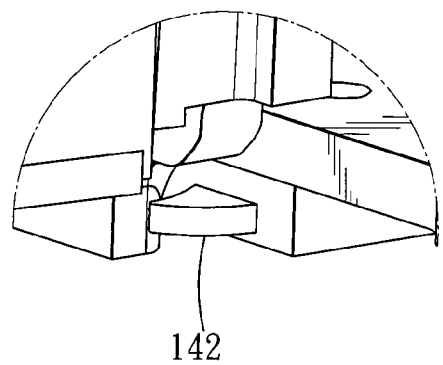
FIG. 4 is an enlarged perspective view of an encircled portion of FIG. 3, illustrating a switch which is disposed adjacent to the cover and which is triggered by movement of the cover.
Figure 5:
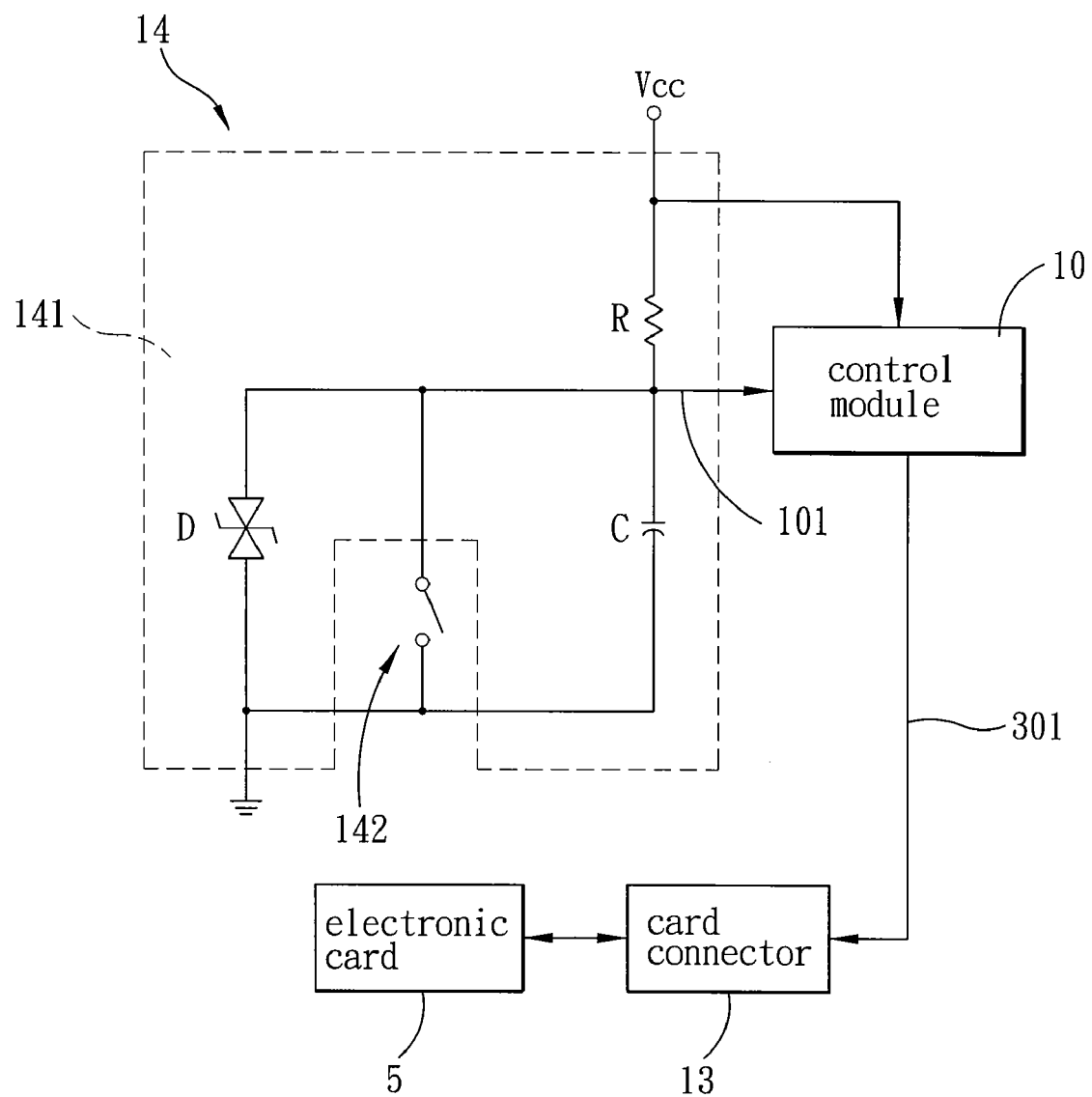
FIG. 5 is a circuit diagram to illustrate a trigger module, which includes a detection circuit that will generate a trigger signal to a control module when the switch is triggered.

Referring to FIGS. 4 and 5, the trigger module 14 includes a detection circuit 141 and a switch 142. The detection circuit 141 is coupled to the switch 142. The switch 142 is triggered upon movement of the cover 131, and is electrically connected when triggered such that the detection circuit 141 generates a trigger signal 101 that is transmitted to the control module 10.

It is noted that the switch 142 is triggered when the cover 131 is opened, which may be for card installation or removal. When the control module 10 receives the trigger signal 101, if it is detected that a state of electrical connection of the card connector 13 with the electronic card 5 switches from a disconnected state to a connected state, the control module 10 determines a card insertion mode, and enables delivery of the power signal (Vcc) to the electronic card 5 inserted into the card connector 13. It is noted that the card connector 13 may dispense with the cover 131 so long as the switch 142 can be triggered, for example, by an external force prior to installation or removal of the electronic card 5. That is, any arrangement that includes the switch 142 which can be triggered for installation or removal of the electronic card 5 should fall within the scope of inventive concept of the present invention.

In the first preferred embodiment, the detection circuit 141 includes a protection element (D) to resist electrostatic discharge (ESD), a resistor (R) and a capacitor (C). The resistor (R) has one end for receiving the power signal (Vcc), and another end coupled in parallel to the switch 142, the protection element (D) and the capacitor (C), which are coupled in parallel and grounded. When the switch 142 is in an on state, the power signal (Vcc) is grounded via the switch 142, so that the trigger signal 101 is a low-level voltage. When the switch 142 is in an off state, the trigger signal 101 is a high-level voltage.

Figure 6A:
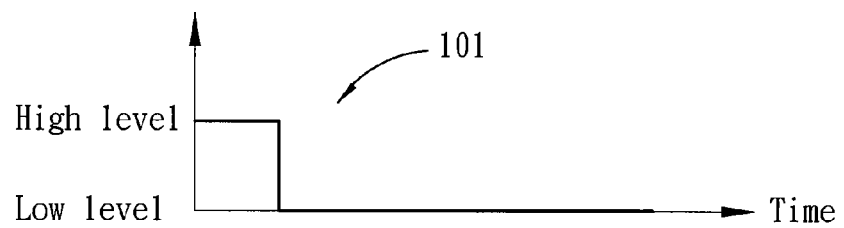
FIG. 6a is a waveform diagram illustrating that the trigger signal changes from high level to low level when the cover is opened and then closed.
Figure 6B:
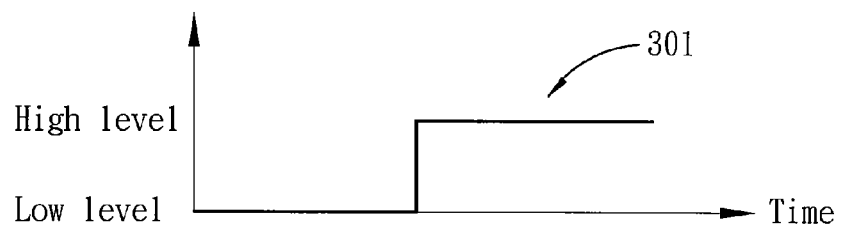
FIGS. 6b and 6c are waveform diagrams to illustrate states of a voltage signal during card insertion and card removal, respectively.

Referring to FIG. 6a, when the cover 131 is opened, the switch 142 is in the off state, so that the trigger signal 101 becomes a high-level voltage. When the cover 131 is closed, the switch 142 is in an on state, so that the trigger signal 101 becomes a low-level voltage. Referring to FIG. 6b, after the cover 131 is opened, when the control module 10 detects that the card connector 13 is electrically connected to the electronic card 5, a high-level voltage signal 301 is generated and supplied to the electronic card 5 inserted into the card connector 13.

Figure 6C:
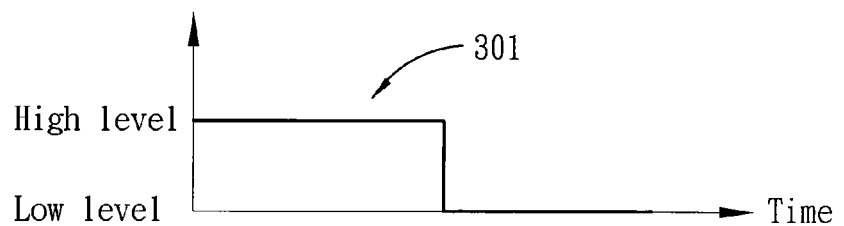

Referring to FIG. 6c, if the card connector 13 has been electrically connected to the electronic card 5 when the cover 131 opens, the control module 10 immediately cuts off power supply to the electronic card 5, i.e., supply of the high-level voltage signal to the card connector 13 is cut off. It is particularly noted that the detection of whether the card connector 13 is electrically connected to the electronic card 5 by the control module 10 may be conducted upon opening of the cover 131 or upon powering on of the communications device 100. In other words, there is no order of priority for the detection of whether the cover 131 is opened and the detection of whether the card connector 13 is electrically connected to the electronic card 5. In addition, the control module 10 can immediately cut off power supply to the electronic card 5 when the cover 131 opens. This action can be set via software. It is not necessary to confirm whether the electronic card 5 has been inserted.

Referring once again to FIG. 2, after causing power to be supplied to the electronic card 5, the control module 10 may automatically read the stored data 501 from the electronic card 5 via the card connector 13 and write the same into the memory module 15 as stored data 151. In addition, the control module 10 may further automatically connect to a communications network 3 to register the communications device 100 on the communications network 3 using the user identification data contained in the stored data 151 (501).

Aside from detecting the card insertion mode, the control module 10 can further detect whether the electronic card 5 is in a card removal mode. The control module 10 determines a card removal mode if the control module 10 detects electrical connection of the card connector 13 with the electronic card 5 after receiving the trigger signal 101. The control module 10 then cuts off supply of power to the card connector 13 so as to prevent possible damage to the electronic card 5 that is to be removed. In addition, the control module 10 removes the stored data 151 from the memory module 15 prior to termination of power supply to the card connector 13.

Therefore, in the communications device 100 that permits change of an electronic card without powering off according to the present invention, with the arrangement of the control module 10 that cooperates with the trigger module 14 to detect electrical connection of the card connector 13 with the electronic card 5 and to determine whether or not to supply power to the card connector 13, it is not necessary to power off the communications device 100 during installation or removal of the electronic card 5. Moreover, installation or removal of the electronic card 5 is relatively easy and convenient to conduct.

Figure 7:
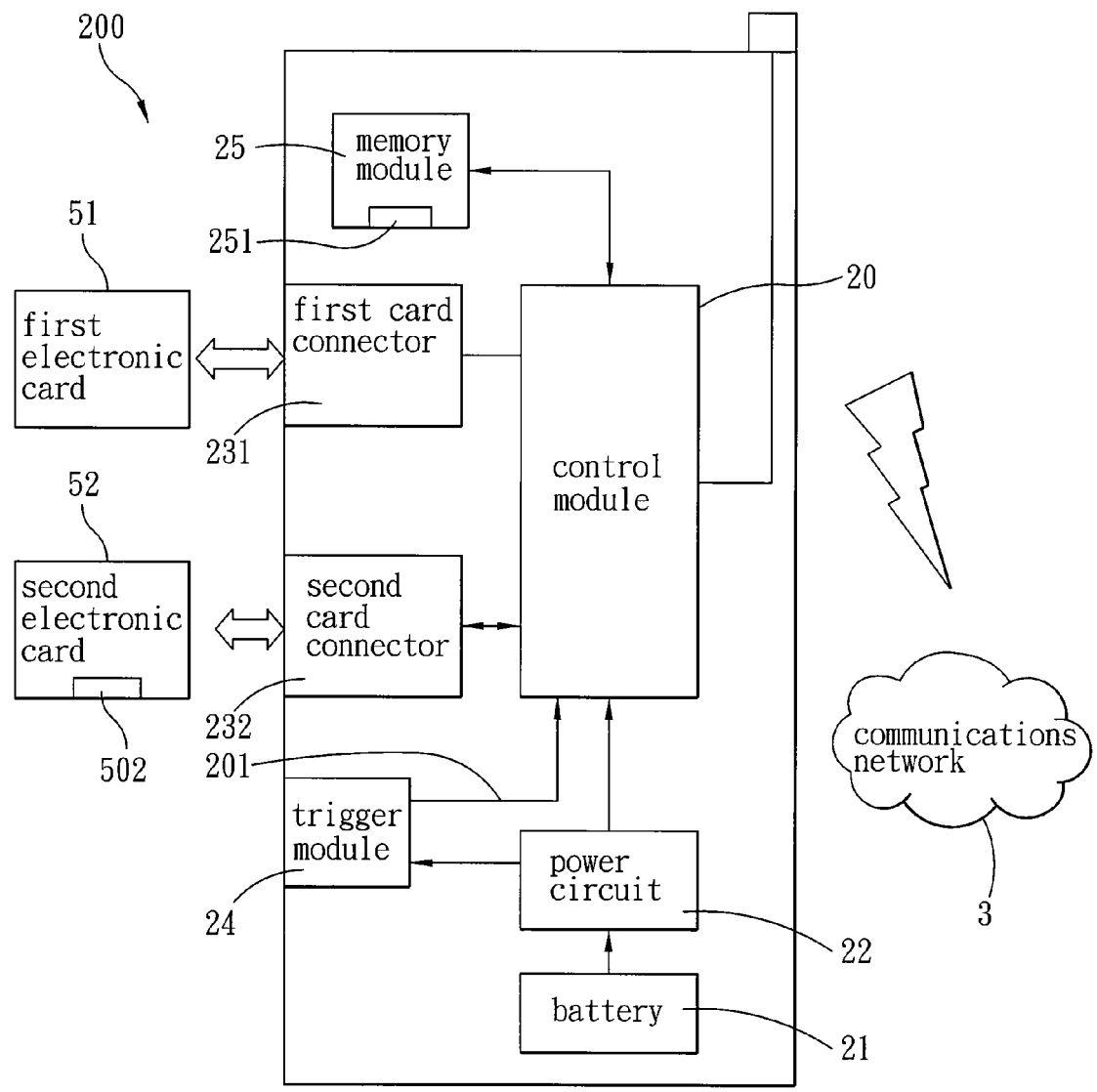
FIG. 7 is a system block diagram to illustrate the second preferred embodiment of a communications device that permits change of an electronic card without powering off according to the present invention.

FIG. 7 shows the second preferred embodiment of a communications device 200 that permits change of an electronic card without powering off according to the present invention. The communications device 200 is a dual-mode handset adapted for receiving first and second electronic cards 51, 52, and includes a control module 20, a battery 21, a power circuit 22, a first card connector 231, a second card connector 232, a trigger module 24, and a memory module 25.

It is noted that the first and second electronic cards 51, 52 are exemplified herein as primary and secondary cards. Since it is customary that the primary card is not frequently changed in use like the secondary card, the technical content disclosed in the first preferred embodiment may be employed in the design of a mechanism for installing the secondary card. Specifically, the second card connector 232 is similar to the card connector 13 of the first preferred embodiment, and includes the cover 131, the switch 142, and the connector body 133. Since the operating principles for the battery 21, the power circuit 22 and the trigger module 24 are similar to those for the battery 11, the power circuit 12 and the trigger module 14 of the first preferred embodiment, they are therefore omitted herein for the sake of brevity.

Similar to the control module 10 of the first preferred embodiment, if the control module 20 detects a state of electrical connection of the second card connector 232 with the second electronic card 52 after receiving a trigger signal 201 from the trigger module 24, the control module 20 determines a card insertion mode and enables power to be supplied to the second electronic card 52 inserted into the second card connector 232. The control module 20 may then automatically read stored data 502 from the second electronic card 52 via the second card connector 232 after power is supplied thereto, and write the data read thereby into the memory module 25 as stored data 251. The control module 20 may further automatically connect to a communications network 3 to register with the communications network 3 using the user identification data contained in the stored data 251 (502).

Aside from detecting the card insertion mode, the control module 20 can further detect whether the second electronic card 52 is in a card removal mode. The control module 20 determines a card removal mode if the control module 20 detects electrical connection of the second card connector 232 with the second electronic card 52 after receiving the trigger signal 201. The control module 20 then cuts off supply of power to the second card connector 232 so as to prevent possible damage to the second electronic card 52 that is to be removed. In addition, the control module 20 removes the stored data 251 from the memory module 25 prior to cutting off power supply to the second card connector 232.

Therefore, by virtue of the configuration of the second card connector 232 and the trigger module 24, the second electronic card 52 (the secondary card) can be quickly installed in or removed from the communications device 200 with the communications device 200 powered on and with the first electronic card 51 (the primary card) installed.

In sum, some of the advantages of the method for permitting change of an electronic card without powering off and a communications device employing the method according to the present invention are as follows:

1. The communications device of this invention supports hot plugging functionality to enable the user to change an electronic card without powering off the communications device, which enhances user convenience while ensuring normal operation of the communications device.

2. For a dual-mode communications device, information, such as phone book entries, text messages, etc., can be immediately updated upon installation of the secondary card, so that information will not be lost and phone calls will not be missed. In addition, there is no need to power off and then power on the communications device during installation or removal of the secondary card.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for permitting change of an electronic card without powering off, said method being adapted for use in a communications device, the communications device including a control module, a card connector and a trigger module, said method comprising the following steps:
when the communications device is in an on state, triggering the trigger module to generate a trigger signal to the control module;
enabling the control module to determine a card insertion mode if it is detected that a state of electrical connection of the card connector with the electronic card changes from a disconnected state to a connected state after receipt of the trigger signal;

enabling the control module for supplying power to the electronic card inserted into the card connector upon determining the card insertion mode;

enabling the control module to determine a card removal mode if it is detected that the card connector is still electrically connected to the electronic card after receipt of the trigger signal; and cutting off power supply to the card connector upon determination of the card removal mode by the control module.

2. The method for permitting change of an electronic card without powering off according to claim 1, further comprising the following steps:

automatically connecting to a communications network upon determination of the card insertion mode by the control module;

reading user identification data from the electronic card; and registering with the communications network using the user identification data.

3. A method for permitting change of an electronic card without powering off, said method being adapted for use in a communications device that includes a control module, a card connector, a trigger module, and a memory module, said method comprising the following steps:

when the communications device is in an on state, triggering the trigger module to generate a trigger signal to the control module;

enabling the control module to determine a card removal mode if it is detected that the card connector is still electrically connected to the electronic card after receipt of the trigger signal; and cutting off power supply to the card connector upon determination of the card removal mode by the control module.

4. The method for permitting change of an electronic card without powering off according to claim 3, further comprising the following step:

enabling the control module to remove from the memory module stored data of the electronic card previously stored in the memory module prior to cutting off power supply to the card connector.

5. A communications device adapted to permit change of an electronic card without powering off, comprising:

a power source;

a card connector adapted for pluggable electrical connection of the electronic card thereto and for delivering power to the electronic card;

a control module adapted for controlling whether power is to be supplied to the electronic card; and a trigger module having a switch and a detection circuit, said detection circuit generating a trigger signal to said control module upon triggering of said switch;

said control module determining a card insertion mode and enabling supply of power from said power source to the electronic card connected to said card connector if it is detected that a state of electrical connection of said card connector with the electronic card changes from a disconnected state to a connected state after receipt of the trigger signal;

wherein said control module determines a card removal mode and is adapted to cut off power supply to said card connector if it is detected that said card connector is still electrically connected to the electronic card after receipt of the trigger signal.

6. The communications device adapted to permit change of an electronic card without powering off according to claim 5, further comprising a memory module, said control module automatically reading stored data from the electronic card after power is supplied to said card connector and writing the stored data read thereby into said memory module.

7. The communications device adapted to permit change of an electronic card without powering off according to claim 5, wherein said control module automatically removes the stored data of the electronic card from said memory module prior to cutting off the power supply to said card connector.

8. The communications device adapted to permit change of an electronic card without powering off according to claim 5, wherein, after power is supplied to said card connector, said control module reads user identification data from the electronic card, and automatically connects to a communications network to register with the communications network using the user identification data.

9. A communications device adapted to permit change of an electronic card without powering off, comprising:

a power source;

a first card connector adapted for pluggable electrical connection of a first electronic card thereto and for delivering power to the first electronic card;

a second card connector adapted for pluggable electrical connection of a second electronic card thereto and for delivering power to the second electronic card;

a control module adapted for controlling whether power is to be supplied to the second electronic card; and a trigger module having a switch and a detection circuit, said detection circuit generating a trigger signal to said control module upon triggering of said switch;

said control module determining a card insertion mode and enabling supply of power from said power source to the second electronic card connected to said second card connector if it is detected that a state of electrical connection of said second card connector with the second electronic card changes from a disconnected state to a connected state after receipt of the trigger signal;

wherein said control module determines a card removal mode and is adapted to cut off power supply to said second card connector if it is detected that said second card connector is still electrically connected to the second electronic card after receipt of the trigger signal.

10. The communications device adapted to permit change of an electronic card without powering off according to claim 9, further comprising a memory module, said control module automatically reading stored data from the second electronic card after power is supplied to said second card connector and writing the stored data read thereby into said memory module.

11. The communications device adapted to permit change of an electronic card without powering off according to claim 9, wherein said control module automatically removes the stored data of the second electronic card from said memory module prior to cutting off the power supply to said second card connector.

12. The communications device adapted to permit change of an electronic card without powering off according to claim 9, wherein, after power is supplied to said second card connector, said control module reads user identification data from the second electronic card, and automatically connects to a communications network to register with the communications network using the user identification data.

13. A communications device adapted to permit change of an electronic card without powering off, comprising:

a power source;

a first card connector adapted for pluggable electrical connection of a first electronic card thereto and for delivering power to the first electronic card;

a second card connector adapted for pluggable electrical connection of a second electronic card thereto and for delivering power to the second electronic card;

a control module adapted for controlling whether power is to be supplied to the second electronic card; and a trigger module having a switch and a detection circuit, said detection circuit generating a trigger signal to said control module upon detecting triggering of said switch;

said control module determining a card removal mode and cutting off power supply to said second card connector if it is detected that said second card connector is still electrically connected to the second electronic card after receipt of the trigger signal.

14. The communications device adapted to permit change of an electronic card without powering off according to claim 13, further comprising a memory module, said control module automatically removing stored data of the second electronic card from said memory module prior to cutting off the power supply to said second card connector.

* * * * *